US012131369B2

(12) United States Patent
Naito et al.

(10) Patent No.: US 12,131,369 B2
(45) Date of Patent: Oct. 29, 2024

(54) MERCHANDISE REGISTRATION DEVICE AND METHOD

(71) Applicant: TOSHIBA TEC KABUSHIKI KAISHA, Tokyo (JP)

(72) Inventors: Hidehiro Naito, Mishima Shizuoka (JP); Atsushi Miyashima, Izunokuni Shizuoka (JP); Toshihiro Kaneko, Izunokuni Shizuoka (JP); Yuki Kawaguchi, Tagata Shizuoka (JP); Taiki Tanihira, Izunokuni Shizuoka (JP); Shinsuke Yajima, Mishima Shizuoka (JP); Masaki Ito, Numazu Shizuoka (JP); Takahiro Saitou, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 276 days.

(21) Appl. No.: 17/543,523

(22) Filed: Dec. 6, 2021

(65) Prior Publication Data

US 2022/0261877 A1 Aug. 18, 2022

(30) Foreign Application Priority Data

Feb. 18, 2021 (JP) ................................. 2021-024254

(51) Int. Cl.
G06Q 30/06 (2023.01)
G06Q 20/20 (2012.01)
G06Q 30/0601 (2023.01)

(52) U.S. Cl.
CPC ....... *G06Q 30/0633* (2013.01); *G06Q 20/201* (2013.01); *G06Q 20/208* (2013.01)

(58) Field of Classification Search
None
See application file for complete search history.

(56) References Cited

U.S. PATENT DOCUMENTS

| 5,125,465 A | 6/1992 | Schneider |
| 8,517,266 B2* | 8/2013 | Yamada .................. A47F 9/047 235/383 |
| 10,121,137 B2* | 11/2018 | Edwards .............. G06Q 20/208 |

(Continued)

FOREIGN PATENT DOCUMENTS

| JP | 2007-293766 A | 11/2007 |
| WO | 2009066161 A2 | 5/2009 |

OTHER PUBLICATIONS

Examination Report mailed Jul. 12, 2023, in corresponding Indian Patent Application No. 202244001665, 9 pages.

(Continued)

*Primary Examiner* — Nicholas D Rosen
(74) *Attorney, Agent, or Firm* — Kim & Stewart LLP

(57) ABSTRACT

A merchandise registration device includes a lamp, a reading device reading a symbol on an item and providing identification information for the item, a weight sensor in a table on which a scanned item can be placed, and a processor. The processor performing a registration operation including acquiring identification information for the item and comparing an expected weight of the item to a measured weight from the weight sensor. The processor controlling the lamp to indicate progress states in the registration operation and whether the reading device is ready for reading a symbol for a next item in a sales transaction.

18 Claims, 6 Drawing Sheets

(56) References Cited

U.S. PATENT DOCUMENTS

| | | | |
|---|---|---|---|
| 11,113,683 B2* | 9/2021 | Crooks | H04N 7/183 |
| 11,477,415 B2* | 10/2022 | Migdal | G07G 3/003 |
| 2002/0100804 A1* | 8/2002 | Byun | G06K 7/10881 |
| | | | 235/462.01 |
| 2005/0242176 A1* | 11/2005 | Roberge | G06Q 40/02 |
| | | | 705/16 |
| 2007/0255665 A1 | 11/2007 | Dosugi | |
| 2011/0259952 A1 | 10/2011 | Yamada et al. | |
| 2018/0084227 A1* | 3/2018 | Migdal | G08B 13/19682 |
| 2019/0180264 A1 | 6/2019 | Crooks | |

OTHER PUBLICATIONS

Extended European Search Report mailed Jun. 23, 2022, in corresponding European Patent Application No. 22151545.5, 10 pages.

* cited by examiner

FIG. 4

|   | STATE | FIRST INDICATOR | SECOND INDICATOR |
|---|---|---|---|
| a | WHEN BARCODE CAN BE READ | TURNED ON IN WHITE | TURNED ON IN GREEN |
| b | BARCODE READING SUCCESS | TURNED ON IN WHITE | TURNED ON IN BLUE FOR PREDETERMINED PERIOD OF TIME t2 |
| c | BARCODE READING FAILURE | TURNED OFF | TURNED ON IN RED FOR PREDETERMINED PERIOD OF TIME t1 |
| d | WEIGHT NOT CONFIRMED | TURNED OFF | TURNED ON IN RED |
| e | WHEN WEIGHTS ARE NOT IDENTICAL | TURNED OFF | FLICKERING IN RED |
| f | ITEM HAS NOT BEEN HELD FOR PREDETERMINED PERIOD OF TIME t3 | TURNED OFF | DEPENDING ON PREVIOUS STATE OF SECOND INDICATOR AND WEIGHT CONFIRMATION STATE |

MERCHANDISE REGISTRATION DEVICE AND METHOD

CROSS-REFERENCE TO RELATED APPLICATION

This application is based upon and claims the benefit of priority from Japanese Patent Application No. 2021-024254, filed Feb. 18, 2021, the entire contents of which are incorporated herein by reference.

FIELD

Embodiments of the present invention relate generally to a merchandise registration device, a method carried out thereby, and a non-transitory computer readable medium storing a program causing, when executed, a computer to perform a method for registering merchandise for purchase.

BACKGROUND

In recent years, in stores such as supermarkets and convenience stores, self-service check-out devices or self-service cashier stations have become available for customers to perform registration operations and settlement operations on items of merchandise to be purchased.

In order to prevent fraud, when a scanned item is placed in a shopping bag or the like, a conventional self-service check-out device has a function of measuring the weight of the item and confirming whether the measured weight matches a weight pre-stored for the same item type in the check-out device. Since it typically takes several seconds to measure the weight, if the next item is scanned before the previous item weight is confirmed, the weight confirmation process cannot keep up. To prevent that situation, the self-service check-out terminal may be configured to not permit registration on the next item until the preceding confirmation of item weight is completed. However, a customer who does not know such a restriction on registration exist may try to scan the next item and may get confused by the failure of the registration attempt.

BRIEF DESCRIPTION OF DRAWINGS

FIG. 4 is a diagram illustrating operations of a first indicator and a second indicator included in a self-service check-out device.

DETAILED DESCRIPTION

In general, according to one embodiment, a merchandise registration device and a corresponding method that can notify customers of a timing at which an item of merchandise can be scanned or the like for purposes of registration are provided.

According to one embodiment, a merchandise registration device includes a lamp, a reading device configured to read a symbol on an item providing identification information for the item, a table on which an item can be placed after a reading of the symbol on the item by the reading device, a weight sensor configured to output a measured weight of items on the table, and a processor. The processor is configured to perform a registration operation including: acquiring identification information for the item based on the symbol by the reading device, acquiring the measured weight from the weight sensor, acquiring from a memory an expected weight for the item associated with the acquired identification information, checking whether the measured weight corresponds to the expected weight for the item, and registering the item in a sales transaction using the identification information if the measured weight corresponds to the expected weight of the item. The processor is configured to control the lamp to indicate progress states in the registration operation and whether the reading device is ready for reading a symbol for a next item in the sales transaction.

A self-service check-out device 10 used in a point-of-sale (POS) system in a retail store according to an embodiment is described as an example.

(Configuration of Self-Service Check-Out Device)

Figure 1:
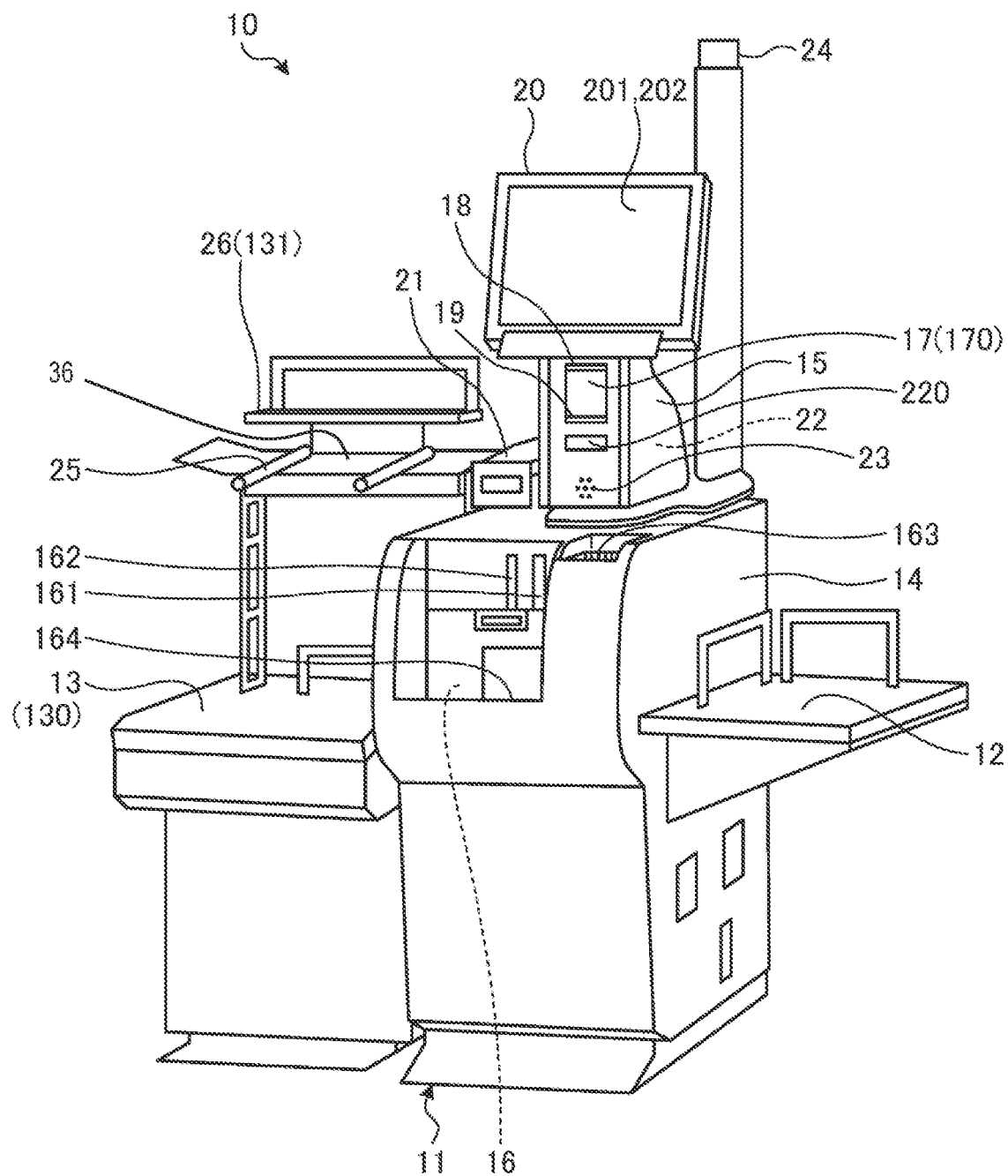
FIG. 1 is an external perspective view illustrating a self-service check-out device according to an embodiment.

First, with reference to FIG. 1, a configuration of the self-service check-out device 10 is described. FIG. 1 is an external perspective view illustrating an example of the self-service check-out device 10.

The self-service check-out device 10 includes a main body unit 11, a first mounting table 12, and a second mounting table 13. The main body unit 11 is provided between the first mounting table 12 and the second mounting table 13.

The main body unit 11 includes a first housing 14, a second housing 15, a cash payment unit 16, a fixed scanner 17, a first indicator 18, a second indicator 19, a display operation panel 20, a card reader/writer 21, a receipt printer 22, a speaker 23, and a warning light 24.

The first housing 14 is formed in a substantially box shape, and houses a control unit 40 (see FIG. 3) and various components such as the cash payment unit 16 described below. The second housing 15 is an outer shell of the fixed scanner 17 and the receipt printer 22 and is provided on the upper surface of the first housing 14.

The cash payment unit 16 includes a bill insertion port 161, a bill dispense port 162, a coin insertion port 163, and a coin dispense port 164. The cash payment unit 16 accepts a bill and a coin via the bill insertion port 161 and the coin insertion port 163, and stores the bill and coin for each denomination. Then, the cash payment unit 16 dispenses coins from the bill dispense port 162 and/or the coin dispense port 164.

The fixed scanner 17 is a reading device for optically reading a code symbol and includes a photographing window 170 on the upper portion of the second housing 15 and a photographing unit (not illustrated) provided inside the photographing window 170. The photographing unit photographs, for example, a code symbol such as a barcode shown on an item held by a customer in front of the photographing window 170, and decodes the code symbol into identification information for uniquely specifying the item such as a commodity code. The self-service check-out device 10 searches a merchandise master Fa (see FIG. 2) for the decoded identification information to uniquely specify the merchandise held over the fixed scanner 17.

The fixed scanner 17 includes therein a proximity sensor that detects the approach of an object to the photographing window 170. The proximity sensor is, for example, an ultrasonic sensor. When the proximity sensor detects the approach of an object, the photographing unit of the fixed scanner 17 is activated to photograph the object held over or near the photographing window 170. In this manner, by photographing the object only when the object approaches the photographing window 170, erroneous detection can be prevented, and the power of the fixed scanner 17 can be saved.

In addition to the function of reading a code symbol such as a barcode, the fixed scanner 17 may include an object recognizing function of recognizing an item of merchandise from the image of the item photographed by the photographing unit through the photographing window 170. The fixed scanner 17 may include both of the function of reading a code symbol such as a barcode and the object recognizing function of recognizing an item from the image held over the photographing window 170.

The first indicator 18 is provided in an upper end portion of the photographing window 170 of the fixed scanner 17. The first indicator 18 is, for example, a lamp such as a white LED and turns on and off to indicate that an item is being held over the fixed scanner 17 or the photographing window 170. The first indicator 18 is installed inside the fixed scanner 17 and also serves as an illumination light for illuminating the items when held over the photographing window 170.

The second indicator 19 is provided in the lower end portion of the photographing window 170 of the fixed scanner 17. The second indicator 19 is, for example, a plurality of lamps such as LEDs having different colors such as red, blue, and green, and selectably turns on and off or blinks to indicate that, at least a weight determination unit 404 (see FIG. 3) described below has confirmed a determination result. The second indicator 19 indicates states in which the fixed scanner 17 is ready for reading identification information of an item, in which the fixed scanner 17 has read the identification information of the item, and in which the fixed scanner 17 is not ready for reading the identification information of an item.

The installation positions of the first indicator 18 and the second indicator 19 are not limited to the positions described above, and can be appropriately installed at any position easily recognized by the user.

In addition to the fixed scanner 17, the self-service check-out device 10 may include a handheld-type "handy" scanner. The handy scanner is used for reading a code symbol attached to an item (e.g., a heavy commodity) that is difficult for a customer to hold over the fixed scanner 17.

The display operation panel 20 includes a display device 201 and a touch panel 202, and is attached to the upper portion of the second housing 15. The display device 201 is, for example, a liquid crystal panel or an organic EL panel and displays various screens according to the instructions of the control unit 40 (see FIG. 2). The touch panel 202 is stacked on the display surface of the display device 201 and outputs information indicating the position touched by the customer to the control unit 40. The control unit 40 outputs an operation instruction according to the information that has been output from the touch panel 202 to the self-service check-out device 10.

The card reader/writer 21 is disposed on the upper surface of the first housing 14. The card reader/writer 21 reads and writes information from and to a card medium such as a point card, a prepaid-type or postpay-type electronic money card, and a credit card. For example, the card reader/writer 21 reads from the card medium such information used for the credit settlement or the electronic money settlement and outputs the information to the control unit 40. The card reader/writer 21 receives an instruction from the control unit 40 and adds points according to a purchased price to points recorded on the point card.

The receipt printer 22 includes a printing unit (not illustrated) built in the second housing 15 and a receipt dispensing port 220 provided on the front surface of the second housing 15. The receipt printer 22 dispenses a receipt printed by the printing unit from the receipt dispensing port 220.

The speaker 23 outputs information to the customer by a voice or a sound if necessary.

The warning light 24 is, for example, a lamp such as a red LED, and is turned on or blinks when an abnormality occurs in the self-service check-out device 10 or when a clerk is called.

The first mounting table 12 is a table on which one or commodities before registration are placed, and is fixed to the side surface portion of the main body unit 11.

The second mounting table 13 is a table on which one or more commodities of which their identification information have been read by the fixed scanner 17 are placed, and is installed on the side opposite to the first mounting table 12 with the main body unit 11 sandwiched therebetween. The second mounting table 13 includes a weight sensor 130 or a scale therein.

Hooks 25 are provided above the second mounting table for hanging a container, such as a shopping basket provided by the store or a bag of the customer, that stores a registered item from which the identification information has been read.

A temporary placing table 36 on which a registered item is temporarily placed before being stored in the container is provided above the second mounting table 13. The temporary placing table 36 is used as a table on which, for example, a fragile item such as eggs or bread that can be damaged or deformed easily is temporarily placed so that the customer can store it in the container after storing the other commodities. The temporary placing table 36 includes a weight sensor 131 therein.

The weight sensor 130 measures the weight of commodities of which the identification information have been read, and which are stored in the container hung on the hooks 26. The weight sensor 130 includes a load cell and an analog-to-digital conversion circuit. The load cell is a sensor that is connected to the second mounting table and measures the weight of the commodities (items) mounted on the second mounting table 13. The load cell outputs a measured value that corresponds to the weight of all the objects including the commodities on the second mounting table 13 as an analog value. Then, the analog-to-digital conversion circuit converts the analog value into a digital value and outputs the digital value to the control unit 40.

Figure 2:
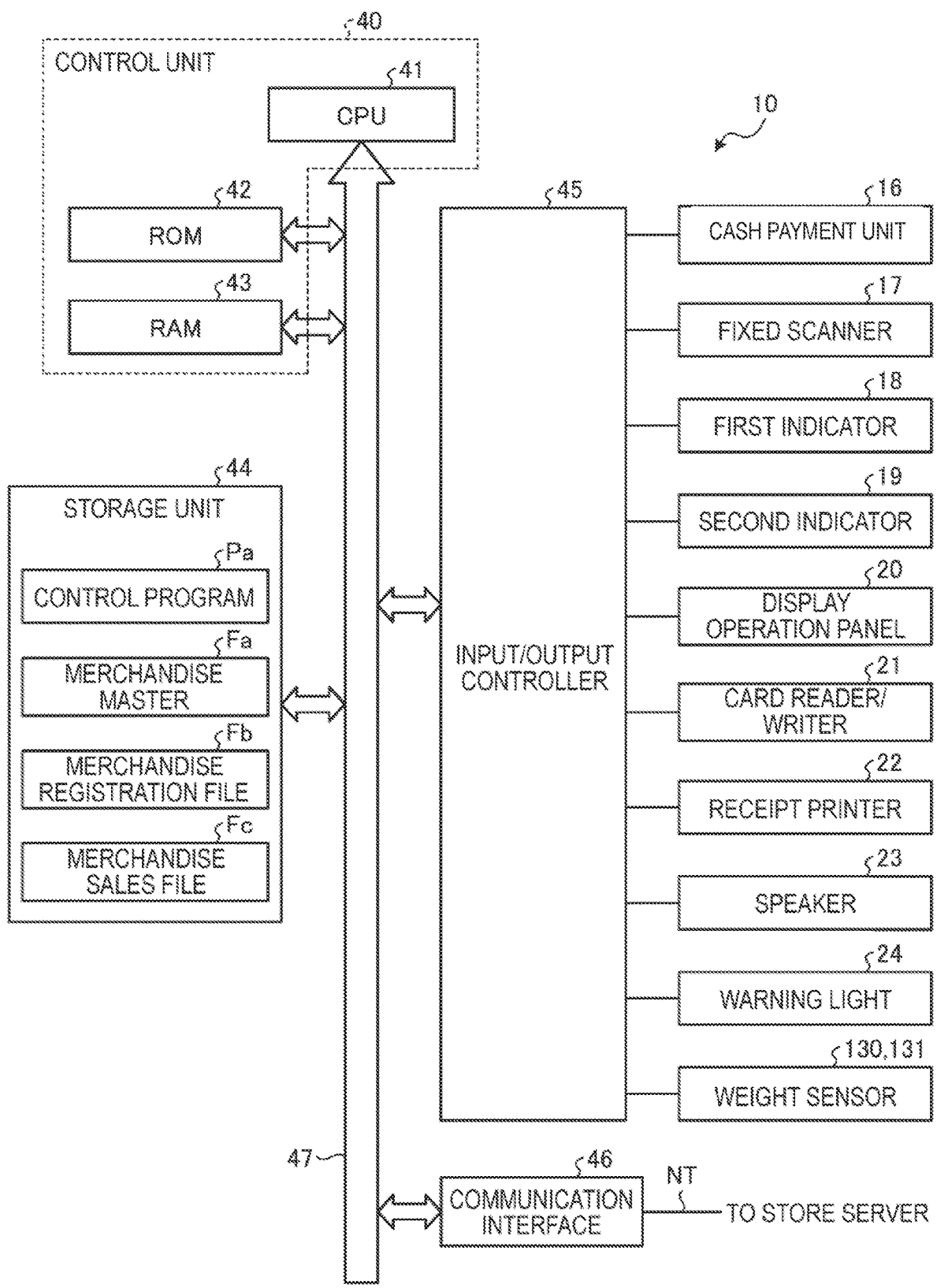
FIG. 2 is a hardware block diagram of a self-service check-out device.

The weight of every type of item of merchandise sold in the store is registered in the merchandise master Fa (see FIG. 2). Thus, when a registered item of merchandise is moved to the second mounting table 13, the self-service check-out device 10 determines whether the weight increase measured by the weight sensor 130 and the previously stored weight of the item corresponding to the identification information that has been read match each other. Also, when it is determined that the weight increase measured by the weight sensor 130 and the stored weight of the item corresponding to the identification information that has been read match each other, the self-service check-out device 10 determines that the item has been correctly stored in the container.

The weight sensor 131 measures the weight of the scanned items that have been placed on the temporary placing table 36. The weight sensor 131 has substantially the same configuration as the weight sensor 130. When a scanned item is moved to the temporary placing table 36, the self-service check-out device 10 determines whether the weight increase measured by the weight sensor 131 and the previously stored weight for items corresponding to the identification information has been read match each other. If it is determined that the weight increase measured by the weight sensor 131 matches the weight of the item for which the identification information has been read, the self-service check-out device 10 determines that the item has been correctly placed on the temporary placing table 36.

(Hardware Configuration of Self-Service Check-Out Device)

Subsequently, a hardware configuration of the self-service check-out device 10 is described with reference to FIG. 2. FIG. 2 is a hardware block diagram of the self-service check-out device 10.

The self-service check-out device 10 includes the control unit 40, a storage unit 44, an input/output controller 45, and a communication interface 46.

The control unit 40 includes a Central Processing Unit (CPU) 41, a Read Only Memory (ROM) 42, and a Random Access Memory (RAM) 43. The CPU 41 is a processor to perform various processes to achieve the functions of the self-service check-out device 10. The ROM 42 stores various data, various tables, and the like. The RAM 43 functions as a work memory and stores one or more programs to be executed by the CPU 41 and various data.

The storage unit 44 stores a control program Pa, the merchandise master Fa, a merchandise registration file Fb, and a merchandise sales file Fc. The storage unit 44 is, for example, a Hard Disk Drive (HDD) that maintains data even when the power is turned off. Further, instead of the HDD, a non-volatile memory such as a flash memory may be used.

The control program Pa is a program executed by the CPU 41. The CPU 41, the ROM 42, the RAM 43, and the storage unit 44 are connected to each other via an internal bus 47. In the control unit 40, the CPU 41 reads the control program Pa stored in the storage unit 44 and various data stored in the ROM 42 and loads the control program Pa and data onto the RAM 43 to be operated. Accordingly, the control unit 40 performs various control processes performed by the self-service check-out device 10.

The merchandise master Fa is a file in which identification information such as Japanese Article Numbering (JAN) codes that are uniquely allocated to commodities and product types, and commodity information such as names, prices, and commodity types are stored in correlated manner. The merchandise registration file Fb is a file in which identification information of items registered by a customer is stored. The merchandise sales file Fc is a file in which merchandise sales information generated by the self-service check-out device 10 when performing the registration process and the settlement process is stored.

The input/output controller 45 connects the CPU 41 and various peripheral devices, that is, the cash payment unit 16, the fixed scanner 17, the first indicator 18, the second indicator 19, the display operation panel 20, the card reader/writer 21, the receipt printer 22, the speaker 23, and the weight sensors 130 and 131 via the internal bus 47. The input/output controller 45 controls the operation of these peripheral devices in response to the instruction from the control unit 40.

The communication interface 46 is a network interface circuit configured to connect the self-service check-out device 10 to a store server via a communication line NT. The self-service check-out device 10 updates the merchandise master Fa through the communications from the store server. The self-service check-out device 10 transmits the merchandise registration file Fb and the merchandise sales file Fc that are sales history to the store server.

(Function Configuration of Self-Service Check-Out Device)

Figure 3:
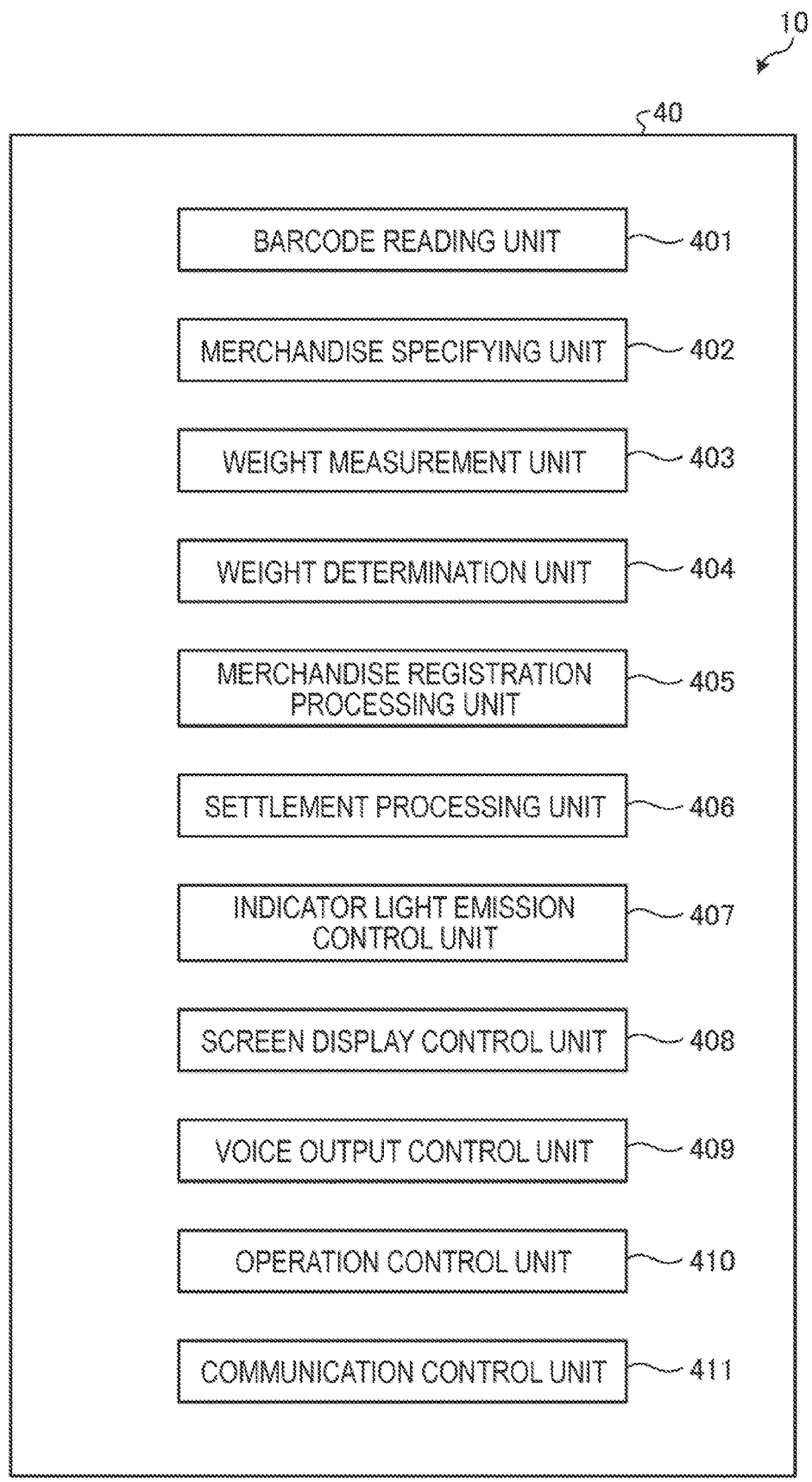
FIG. 3 is a function block diagram of a self-service check-out device.

Subsequently, a function configuration of the self-service check-out device 10 is described with reference to FIG. 3. FIG. 3 is a function block diagram of the self-service check-out device 10.

The control unit 40 of the self-service check-out device 10 loads the control program Pa onto the RAM 43 and operates the control program Pa to perform the functions of: a barcode reading unit 401, a merchandise specifying unit 402, a weight measuring unit 403, the weight determination unit 404, a merchandise registration processing unit 405, a settlement processing unit 406, an indicator light emission control unit 407, a screen display control unit 408, a voice output control unit 409, an operation control unit 410, and a communication control unit 411.

The barcode reading unit 401 determines whether an item is held over the photographing window 170. The barcode reading unit 401 reads a barcode attached to or printed on the item and obtains the identification information to identify the item. A two-dimensional code reading function may be further added to the barcode reading unit 401.

The merchandise specifying unit 402 refers to the merchandise master Fa based on the identification information that has been read by the barcode reading unit 401. The merchandise specifying unit 402 uniquely specifies an item by searching for the identification information that has been read by the barcode reading unit 401 in the merchandise master Fa.

The weight measuring unit 403 measures the weight of the item that has been identified by the merchandise specifying unit 402. More specifically, the weight measuring unit 403 measures the change in the weight of a container (e.g., a shopping bag) on the hooks 26. The customer places the item(s) in the container after scanning each item so that the measured weight increases by the weight of each newly placed item. The weight measuring unit 403 measures that weight increase. Since the weight measured by the weight measuring unit 403 is generally not stable for some amount of time after each new item is placed in the container, the weight measuring unit 403 frequently measures the weight, and the weight increase of the container is specified only after the measured weight value becomes stable.

The weight determination unit 404 determines whether the expected (pre-stored) weight of the item that has been specified by the merchandise specifying unit 402 (based on the identification information read by the barcode reading unit 401) matches the weight increase of the container as measured by the weight measuring unit 403. When the expected weight of the item based on the identification information read by the barcode reading unit 401 and the weight increase that has been measured by the weight measuring unit 403 match each other, it is determined that the correct item (that is, the item identified by the merchandise specifying unit 402) has been placed in the container.

The merchandise registration processing unit 405 registers the item when the weight determination unit 404 has determined that the item that has been specified by the merchandise specifying unit 402 is correctly stored in the container, in other words, the weight determination unit 404 has determined that the expected weight of the item based on the identification information and the measured weight of the item as measured by the weight measuring unit 403 match each other.

The settlement processing unit 406 performs a settlement process related to the item that has been registered by the merchandise registration processing unit 405. The settlement processing unit 406 performs the settlement process by a method selected by the customer, among various settlement methods such as cash settlement, electronic money settlement, credit card settlement, and smartphone settlement.

The indicator light emission control unit 407 controls the lighting state or the blinking state of each of the first indicator 18 and the second indicator 19 based on the operation state and the determination result of the weight determination unit 404, and the reading result of the identification information of the item by the fixed scanner 17. The indicator light emission control unit 407 performs this control to notify the customer of whether the barcode reading unit 401 is ready for reading identification information of a new item.

The screen display control unit 408 displays various kinds of information related to the merchandise registration process and the settlement process on the display device 201. The screen display control unit 408 cooperates with the indicator light emission control unit 407 and displays whether the fixed scanner 17 is ready for reading identification information of a new item on the display device 201.

The voice output control unit 409 controls the speaker 23 to output various kinds of information related to the merchandise registration process and the settlement process by a voice or a sound. The voice output control unit 409 cooperates with the indicator light emission control unit 407 to output whether the fixed scanner 17 is ready for reading identification information of a new item by a voice or a sound from the speaker 23.

The operation control unit 410 obtains information about operations made by the customer through the touch panel 202. The CPU 41 controls each unit of the self-service check-out device 10 based on the operation information obtained by the operation control unit 410.

The communication control unit 411 controls the communication interface 46 to transmit and receive information, for example, to and from the server device (not illustrated) via a network NT. Update information for the merchandise master Fa is received from the server device at any time, and the merchandise sales file Fc is transmitted to the server device, for example, at predetermined intervals such as once every half day.

(Notification of Operation State of Fixed Scanner by First and Second Indicators)

Subsequently, the patterns of turning on and off the first indicator 18 and the second indicator 19 are described with reference to FIG. 4. FIG. 4 is a diagram illustrating an example of the operation of the first indicator 18 and the second indicator 19 included in the self-service check-out device.

When the fixed scanner 17 is ready for reading a barcode through the photographing window 170 (state "a" in FIG. 4), the first indicator 18 receives an instruction from the indicator light emission control unit 407 and turns on white light. Additionally, when the fixed scanner 17 has succeeded in reading the barcode (state "b"), the indicator light emission control unit 407 turns on the first indicator 18 in white.

If the fixed scanner 17 cannot or could not read the barcode, the first indicator 18 receives an instruction from the indicator light emission control unit 407 and is turned off. More specifically, when the fixed scanner 17 fails to read the barcode (state "c"), the indicator light emission control unit 407 turns off the first indicator 18. When the weight determination unit 404 has not completed the determination of the weight of the item, that is, the weight of the item has not been confirmed, the indicator light emission control unit 407 turns off the first indicator 18 (state "d"). When the weight determination unit 404 determines that the weight of the item based on the identification information read from the read barcode and the weight of the item that has been measured by the weight measuring unit 403 are not identical to each other, the indicator light emission control unit 407 turns off the first indicator 18 (state "e").

When the item has not been held over the photographing window 170 for a predetermined period of time t3, the indicator light emission control unit 407 turns off the first indicator 18 for power saving. Whether the item has not been held over the photographing window 170 for the predetermined period of time t3 is determined based on the output of the proximity sensor included in the fixed scanner (state "f").

When the fixed scanner 17 is ready for reading a barcode, the second indicator 19 receives an instruction from the indicator light emission control unit 407 and is turned on in green (state "a").

When the fixed scanner 17 has succeeded in reading the barcode (state "b"), the indicator light emission control unit 407 turns on the second indicator 19 in blue for a predetermined period of time t2. Accordingly, the customer recognizes that the barcode is read successfully. Also, after the predetermined period of time t2 elapses, the indicator light emission control unit 407 changes the state of the second indicator 19 according to instructions from the operation state of the weight measuring unit 403 and the weight determination unit 404.

When the fixed scanner 17 fails to read a barcode (state "c"), the indicator light emission control unit 407 causes the second indicator 19 to blink in red for a predetermined period of time t1. Accordingly, the customer recognizes that the reading of the barcode has failed. Then, after the predetermined period of time t1 elapses, the indicator light emission control unit 407 turns on the second indicator 19 in green. After the predetermined period of time t1 elapses, the customer holds the item over the photographing window 170 again and causes the fixed scanner 17 to read the barcode again.

When the weight determination unit 404 has not completed the determination of the weight of the item, that is, the weight of the item has not been confirmed, the indicator light emission control unit 407 turns on the second indicator 19 in red (state "d"). Accordingly, a state in which the barcode cannot be read is indicated. Then, when the weight determination unit 404 ends the determination of the weight of the item and the weight determination unit 404 determines that the weight of the item based on the identification information read from the barcode and the weight of the item that has been measured by the weight measuring unit 403 are identical to each other, the indicator light emission control unit 407 turns on the second indicator 19 in green.

When the weight determination unit 404 determines that the weight of the item based on the identification information read from the barcode and the weight of the item that has been measured by the weight measuring unit 403 are not identical to each other, the indicator light emission control unit 407 causes the second indicator 19 to blink in red (state "e"). In such a case, since the customer is likely to have made a mistake in the registration operation or the customer is likely to be committing fraud, the self-service check-out device 10, for example, causes the warning light 24 to blink to call the clerk.

When the item has not been held over the photographing window 170 for the predetermined period of time t3, the indicator light emission control unit 407 maintains the state of the second indicator 19 in the previous state of the second indicator 19, or the state according to the confirmation state of the weight of the item (state "f").

The pattern of turning on and off and blinking the first indicator 18 and the second indicator 19 illustrated in FIG. 4 is an example, and the embodiments are not limited thereto. The self-service check-out device 10 may notify that the fixed scanner 17 is in each state illustrated in FIG. 4 by displaying text strings on the display device 201 or outputting a voice by the speaker 23, in addition to the notification by the first indicator 18 and the second indicator 19.

(Main State Transition of First and Second Indicators)

Figure 5:
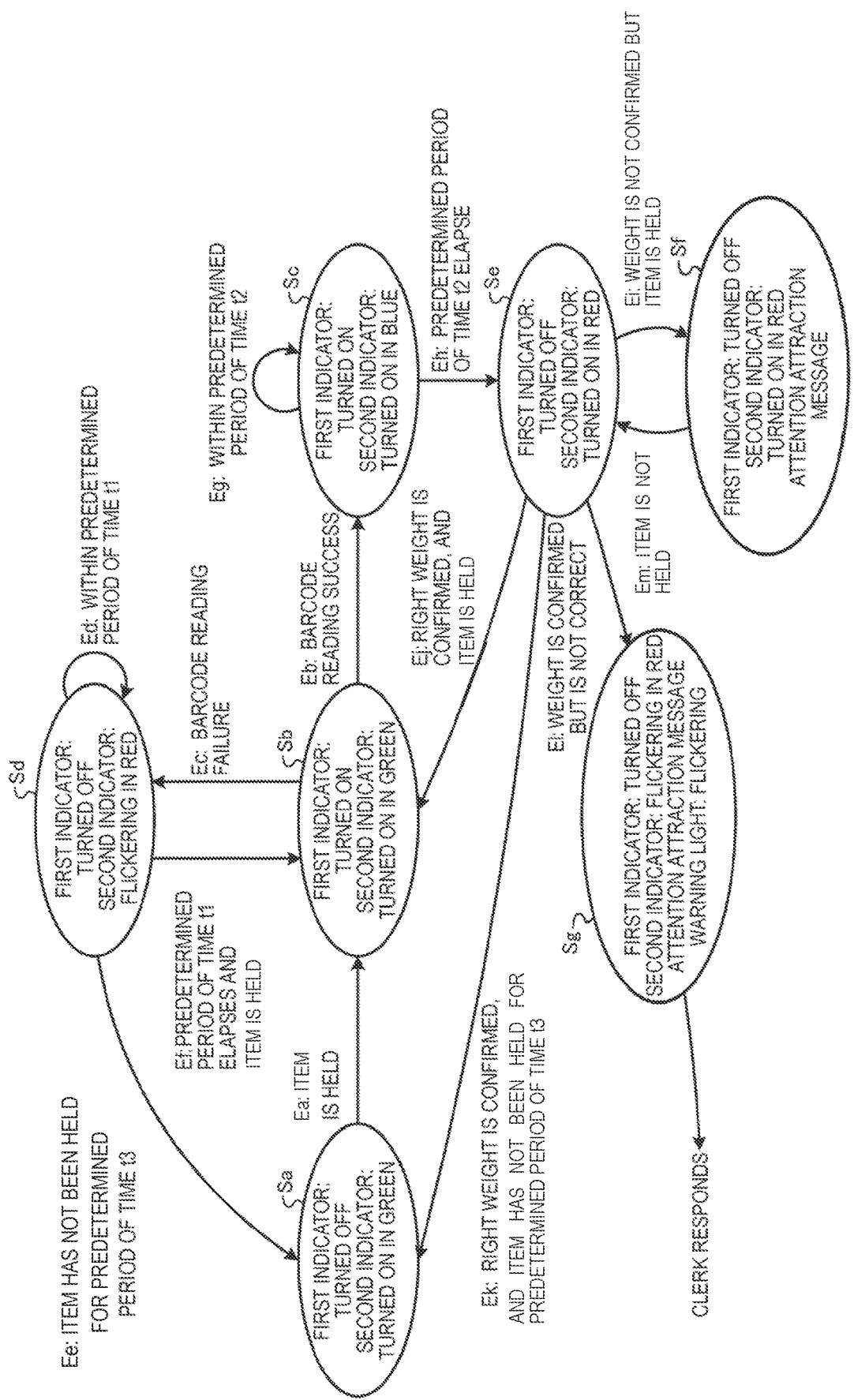
FIG. 5 is a state transition diagram illustrating state transition of a first indicator and a second indicator included in a self-service check-out device.

Subsequently, the state transition of the first indicator 18 and the second indicator 19 included in the self-service check-out device 10 is described with reference to FIG. 5. FIG. 5 is a state transition diagram illustrating an example of the state transition of the first indicator 18 and the second indicator 19 included in the self-service check-out device 10. The state transition diagram of FIG. 5 indicates only some of the changes in the states of the first indicator 18 and the second indicator 19.

The description starts from the state in which the first indicator 18 is turned off, and the second indicator 19 is turned on in green (state Sa). When the self-service check-out device 10 is in the state Sa, if an event of holding an item over the photographing window 170 (event Ea) occurs, the state transitions to a state in which the first indicator 18 is turned on in white, and the second indicator 19 is turned on in green (state Sb). At this point, the fixed scanner 17 reads the barcode attached to or printed on the item.

In case of the state Sb, if the fixed scanner 17 has succeeded in reading the barcode (event Eb), the first indicator 18 maintains the state of being turned on in white, and the second indicator 19 is turned on in blue (state Sc). In addition, the second indicator 19 is continuously turned on in blue for the predetermined period of time t2 (event Eg). Also, if the predetermined period of time t2 elapses (event Eh), the first indicator 18 is turned off, and the second indicator 19 is turned on in red (state Se).

Returning to the state Sb, when the fixed scanner 17 fails to read the barcode (event Ec), the first indicator 18 is turned off, and the second indicator 19 blinks in red (state Sd). The second indicator 19 is continuously turned on in red for the predetermined period of time t1 (event Ed). Then, when the predetermined period of time t1 elapses and the item is held over the photographing window 170 (event Ef), the state transitions to the state Sb.

In the state Sb, when the item has not been held over the photographing window 170 for the predetermined period of time t3 (event Ee), the state transitions to the state Sa.

Returning to the state Se, when (i) the weight measuring unit 403 completes the measurement of the weight of the item stored in the container, (ii) the weight determination unit 404 determines that the weight of the item is correct, that is, the correct weight is confirmed, and (iii) the next item is held over the photographing window 170 (event Ej), the state transitions to the state Sb, and the barcode of the next merchandise is read.

In the state Se, when (i) the weight measuring unit 403 completes the measurement of the weight of the item stored in the container, (ii) the weight determination unit 404 determines that the weight of the item is correct, that is, the correct weight is confirmed, and (iii) the next item has not been held over the photographing window 170 for the predetermined period of time t3 (event Ek), the state transitions to the state Sa.

In the state Se, when (i) the weight measuring unit 403 completes the measurement of the weight of the item stored in the container, (ii) the weight determination unit 404 does not determine that the weight of the item is correct, that is, the correct weight is not confirmed (event El), the state transitions to the state Sg in which the first indicator 18 is maintained to be turned off, and the second indicator 19 blinks in red. In case of the state Sg, an attention attracting message indicating that the weights of the registered commodities are inconsistent with the weights of the commodities that have been actually stored in the container, is displayed on the display device 201, and the clerk may be called by turning on or blinking the warning light 24. Thereafter, the called clerk confirms the situation and then appropriately responds.

In the state Se, if the next item is held over the photographing window 170 in a state in which the weight measuring unit 403 does not complete the measurement of the weight of the item stored in the container (event Ei), the state transitions to a state Sf in which the first indicator 18 is maintained to be turned off, and the second indicator is turned on in red. In case of the state Sf, an attention attracting message indicating to wait for a while until the weight of the item is confirmed may be displayed on the display device 201.

In the state Sf, when the item held over the photographing window 170 is released (event Em), the state transitions to the state Se.

(Flow of Process Performed by Self-Service Check-Out Device)

Figure 6:
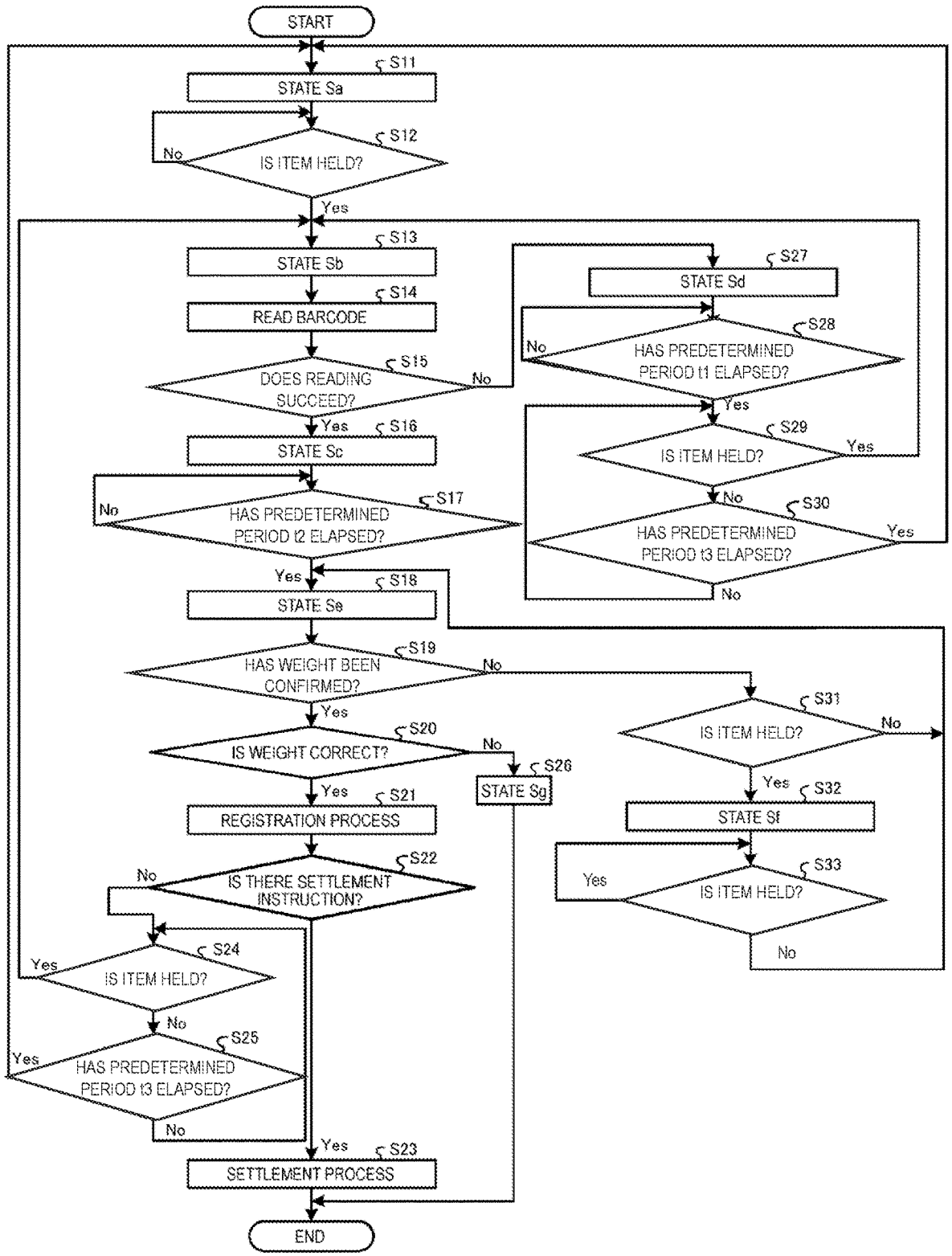
FIG. 6 is a flowchart of a self-service check-out device.

Subsequently, the flow of the process performed by the self-service check-out device 10 is described with reference to FIG. 6. FIG. 6 is a flowchart of the process performed by the self-service check-out device 10. Here, the case where the self-service check-out device 10 starts the process from the state Sa illustrated in FIG. 5 is described.

First, the indicator light emission control unit 407 turns off the first indicator 18 and turns on the second indicator 19 in green (STEP S11).

The barcode reading unit 401 determines whether an item is being held over the photographing window 170 (STEP S12). If it is determined that an item is being held over the photographing window 170 (STEP S12: Yes), the process proceeds to STEP S13. If it is not determined that an item is being held over the photographing window 170 (STEP S12: No), the determination of STEP S12 is repeated.

If it is determined in STEP S12 that an item is being held over the photographing window 170, the indicator light emission control unit 407 then turns on the first indicator 18 and turns on the second indicator 19 in green. That is, the self-service check-out device 10 transitions to the state Sb of FIG. 5 (STEP S13).

The barcode reading unit 401 reads the barcode of the item held over the photographing window 170 (STEP S14).

The barcode reading unit 401 determines whether the reading of the barcode succeeds (STEP S15). If it is determined that the reading of the barcode succeeds (STEP S15: Yes), the process proceeds to STEP S16. If it the reading of the barcode does not succeed (STEP S15: No), the process proceeds to STEP S27.

If the reading of the barcode succeeds in STEP S15, the indicator light emission control unit 407 then turns on the first indicator 18 and turns on the second indicator 19 in blue for the predetermined period of time t2. That is, the self-service check-out device 10 transitions to the state Sc of FIG. 5 (STEP S16).

The indicator light emission control unit 407 determines whether the predetermined period of time t2 has elapsed (STEP S17). If it is determined that the predetermined period of time t2 has elapsed (STEP S17: Yes), the process proceeds to STEP S18. If it is not determined that the predetermined period of time t2 has elapsed (STEP S17: No), the indicator light emission control unit 407 repeats the determination of STEP S17.

If it is determined in STEP S17 that the predetermined period of time t2 has elapsed, the indicator light emission control unit 407 then turns off the first indicator 18 and turns on the second indicator 19 in red. That is, the self-service check-out device 10 transitions to the state Se of FIG. 5 (STEP S18).

Returning to description related to STEP S15, if it is not determined in STEP S15 that the reading of the barcode succeeds, the indicator light emission control unit 407 then turns off the first indicator 18 and causes the second indicator 19 to blink in red for the predetermined period of time t1. That is, the self-service check-out device 10 transitions to the state Sd of FIG. 5 (STEP S27).

The indicator light emission control unit 407 determines whether the predetermined period of time t1 has elapsed (STEP S28). If it is determined that the predetermined period of time t1 has elapsed (STEP S28: Yes), the process proceeds to STEP S29. If the predetermined period of time t1 has not elapsed (STEP S28: No), the indicator light emission control unit 407 repeats the determination of STEP S28.

If it is determined in STEP S28 that the predetermined period of time t1 has elapsed, the barcode reading unit 401 next determines whether an item is being held over the photographing window 170 (STEP S29). If it is determined that an item is held over the photographing window 170 (STEP S29: Yes), the process returns to STEP S13. If it is not determined that an item is being held over the photographing window 170 (STEP S29: No), the process proceeds to STEP S30.

If it is not determined in STEP S29 that an item is being held over the photographing window 170, the indicator light emission control unit 407 then determines whether the predetermined period of time t3 has elapsed (STEP S30). If it is determined that the predetermined period of time t3 has elapsed (STEP S30: Yes), the process returns to STEP S11. If the predetermined period of time t3 has not elapsed, the process returns to STEP S29.

After the self-service check-out device 10 transitions to the state Se (FIG. 5) in STEP S18, the weight measuring unit 403 determines whether the weight of the item stored in the container has been confirmed (STEP S19). If it is determined that the weight of the item has been confirmed (STEP S19: Yes), the process proceeds to STEP S20. If the weight of the item has not been confirmed (STEP S19: No), the process proceeds to STEP S31.

If it is determined in STEP S19 that the weight of the item has been confirmed, the weight determination unit 404 then determines whether the confirmed weight of the item is correct (STEP S20). If the confirmed weight of the item is correct (STEP S20: Yes), the process proceeds to STEP S21. If the confirmed weight of the item is not correct (STEP S20: No), the process proceeds to STEP S26.

If it is determined in STEP S20 that the confirmed weight of the item is correct, the merchandise registration processing unit 405 then registers the item for which the weight has been determined to be correct (STEP S21).

Returning to description related to STEP S19, if the weight of the item has not been confirmed in STEP S19, the barcode reading unit 401 next determines whether an item is being held over the photographing window 170 (STEP S31). If it is determined that a item is held over the photographing window 170 (STEP S31: Yes), the process proceeds to STEP S32. If it is not determined that an item is being held over the photographing window 170 (STEP S31: No), the process returns to STEP S18.

If it is determined in STEP S31 that an item is being held over the photographing window 170, the indicator light emission control unit 407 then turns off the first indicator 18 and turns on the second indicator 19 in red. The screen display control unit 408 displays an attention attracting message on the display device 201. That is, the self-service check-out device 10 transitions to the state Sf of FIG. 5 (STEP S32).

Subsequently, the barcode reading unit 401 determines whether the item is still held over the photographing window 170 (STEP S33). If it is not determined that the item is held over the photographing window 170 (STEP S33: No), the process returns to STEP S18. If it is determined that the item is being held over the photographing window 170 (STEP S33: Yes), the barcode reading unit 401 repeats the determination of STEP S33.

Returning to description of STEP S20, if the confirmed weight of the item is not correct in STEP S20, the indicator light emission control unit 407 then turns off the first indicator 18 and causes the second indicator 19 to blink or flicker in red. In addition, the self-service check-out device 10 causes the warning light 24 to blink or flicker to call the clerk. That is, the self-service check-out device 10 transitions to the state Sg of FIG. 5 (STEP S26). Thereafter, the self-service check-out device 10 ends the process of FIG. 6.

After STEP S21, the settlement processing unit 406 determines whether the settlement has been instructed (STEP S22). If it is determined that the settlement has been instructed (STEP S22: Yes), the process proceeds to STEP S23. If settlement has not been instructed (STEP S22: No), the process proceeds to STEP S24.

If, in STEP S22, it is determined that the settlement has been instructed, the settlement processing unit 406 then performs the settlement process (STEP S23). Thereafter, the self-service check-out device 10 ends the process of FIG. 6.

If it is determined in STEP S22 that the settlement has not yet been instructed, the barcode reading unit 401 next determines whether a new item is being held over the photographing window 170 (STEP S24). If it is determined that an item is being held over the photographing window 170 (STEP S24: Yes), the process returns to STEP S13. If an item is not being held over the photographing window 170 (STEP S24: No), the process proceeds to STEP S25.

If it is determined that an item is not being held over the photographing window 170 in STEP S25, the indicator light emission control unit 407 next determines whether the predetermined period of time t3 has elapsed (STEP S25). If it is determined that the predetermined period of time t3 has elapsed (STEP S25: Yes), the process returns to STEP S11. if the predetermined period of time t3 has not elapsed (STEP S25: No), the process returns to STEP S24.

As described above, the self-service check-out device includes the barcode reading unit 401 that reads identification information for identifying an item held over the fixed scanner 17, the weight measuring unit 403 that measures the weight of the item for which the identification information has been read, the weight determination unit 404 that determines whether a preset weight of the item having the same identification information and the weight of the item measured by the weight measuring unit 403 are identical to each other, the merchandise registration processing unit 405 that registers the item when the weight determination unit 404 determines that the weights are identical to each other, and the indicator light emission control unit 407 that notifies whether the barcode reading unit 401 is ready for reading identification information of a new item at least based on the operation state and the determination result of the weight determination unit 404. Accordingly, it is possible to notify the customer of the timing of when identification information of an item can be read.

In the self-service check-out device 10 according to the above embodiments, the indicator light emission control unit 407 includes the first indicator 18 that at least indicates that the fixed scanner 17 can read the identification information and the second indicator 19 that at least indicates that the weight determination unit 404 has confirmed the determination result. Therefore, it is possible to notify the customer of whether identification information of a new item can be read.

In the self-service check-out device 10 according to the above embodiments, when the weight determination unit 404 determines that the weights are identical to each other, the indicator light emission control unit 407 notifies that the barcode reading unit 401 is ready for reading identification information of a new item. Therefore, it is possible to present to the customer that the identification information of a new item can be read.

In the self-service check-out device 10 according to the embodiment, when the weight determination unit 404 does not complete the determination on whether the weights are identical to each other or does not determine that the weights are identical to each other, the indicator light emission control unit 407 notifies that the barcode reading unit 401 is not ready for reading identification information of a new item. Therefore, it is possible to present to the customer that identification information of a new item cannot be read.

In the self-service check-out device 10 according to the above embodiments, in a state of notifying that the barcode reading unit 401 is not ready for reading identification information of a new item, the indicator light emission control unit 407 indicates that the customer should wait for a while when an item is held over the fixed scanner 17. Therefore, it is possible to attract attention to the necessity of waiting for a while in order to read identification information of a new item.

In the above embodiments, the present invention is applied to the self-service check-out device 10. However, the present invention can be applied to a so-called cart POS device in which the functions of a POS terminal for registration and/or settlement processing is installed in a shopping cart so that an item can be registered during the shopping.

While certain embodiments of the present invention have been described, the embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. These embodiments and modifications fall within the scope and spirit of the inventions and fall within the invention described in the claims and their equivalents.

What is claimed is:

1. A merchandise registration device, comprising:
a lamp;
a reading device configured to read a symbol;
a table on which an item for registration is to be placed after a symbol on the item for registration is read by the reading device;
a weight sensor configured to output a signal corresponding to a weight of any items on the table; and
a processor configured to:
perform a registration operation for a first item having a first symbol including:
acquiring identification information for the first item based on the first symbol read by the reading device,
determining a measured weight of the first item based on the signal output from the weight sensor,
acquiring from a memory an expected weight associated with the acquired identification information,
checking whether the measured weight corresponds to the expected weight, and
registering the first item in a sales transaction using the identification information if the measured weight corresponds to the expected weight; and
control the lamp to indicate progress states in the registration operation for the first item and whether the reading device is ready for reading a symbol for a next item in the sales transaction, wherein
the lamp comprises:
a first indicator to indicate that the reading device is ready for reading the symbol for the next item in the sales transaction, and
a second indicator to indicate a processing state in the registration operation including whether the previous item in the sales transaction has been successfully registered.

2. The merchandise registration device according to claim 1, wherein the first and second indicators are adjacent to a reading window of the reading device.

3. The merchandise registration device according to claim 1, wherein the processor is further configured to control the first indicator to indicate that the reading device is not ready until the previous item has been successfully registered.

4. The merchandise registration device according to claim 1, wherein the processor is further configured to control the second indicator to flicker if the measured weight does not correspond the expected weight.

5. The merchandise registration device according to claim 1, wherein the processor is further configured to turn on the first indicator after the measured weight is determined to correspond to the expected weight.

6. The merchandise registration device according to claim 1, wherein the processor is further configured to control the second indicator to emit:
a light of a first color after the measured weight is determined to correspond to the expected weight,
a light of a second color for a predetermined time period after a symbol has been successfully read by the reading device, and
a light of a third color if the symbol is not successfully read by the reading device.

7. The merchandise registration device according to claim 6, wherein the first and second indicators are adjacent to a reading window of the reading device.

8. The merchandise registration device according to claim 7, wherein the first and second indicators are on opposite edges of the reading window.

9. The merchandise registration device according to claim 1, further comprising:
a display, wherein
the processor is further configured to control the display to display a message if the reading device detects a new item is being held in front of a reading window of the reading device before the previous item has been successfully registered, the displayed message instructing an operator to wait.

10. A merchandise registration method, the method comprising:
storing, in a memory, an expected weight of each of a plurality of items in association with identification information for the items;
upon reading of a symbol attached on an item by a reading device, acquiring identification information for the item based on the read symbol;
measuring a weight of an item that has been placed on a table;
acquiring from the memory the expected weight associated with the acquired identification information;
determining whether the measured weight corresponds to the expected weight;
upon determining that the measured weight corresponds to the expected weight, registering the item in a sales transaction based on the identification information;
determining that the reading device is ready for reading a new symbol for a next item in the sales transaction after the measured weight is determined to correspond to the expected weight; and
controlling a lamp to indicate progress states of the sales transaction.

11. The method according to claim 10, further comprising:
determining that the reading device is not ready for reading a new symbol until the previous item is successfully registered in the sales transaction.

12. The method according to claim 11, wherein
the lamp includes first and second indicators, and
the method further comprises turning off the first indicator and changing a color of light emitted from the second indicator.

13. The method according to claim 12, further comprising:
controlling the second indicator to flicker when the measured weight is determined not to correspond to the expected weight.

14. The method according to claim 12, further comprising:
turning on the first indicator after the measured weight is determined to correspond to the expected weight.

15. The method according to claim 12, further comprising:
controlling the second indicator to emit:
a light of a first color after the measured weight is determined to correspond to the expected weight,
a light of a second color for a predetermined time period after a successful reading of a symbol by the reading device, and
a light of a third color after an unsuccessful reading of a symbol by the reading device.

16. The method according to claim 12, wherein the first and second indicators are adjacent to a reading window of the reading device.

17. The method according to claim 16, wherein the first and second indicators are on opposite edges of the reading window.

18. A non-transitory computer readable medium storing a program causing a computer to execute a method for registering merchandise in a sales transaction, the method comprising:
storing, in a memory, an expected weight of each of a plurality of items in association with identification information for the items;
upon reading of a symbol attached on an item by a reading device, acquiring identification information for the item based on the read symbol;
measuring a weight of an item that has been placed on a table;
acquiring from the memory the expected weight associated with the acquired identification information;
determining whether the measured weight corresponds to the expected weight;
upon determining that the measured weight corresponds to the expected weight, registering the item in a sales transaction based on the identification information;
determining that the reading device is ready for reading a new symbol for a next item in the sales transaction after the measured weight is determined to correspond to the expected weight; and
controlling a lamp to indicate progress states of the sales transaction.

* * * * *